United States Patent
Zhou et al.

(10) Patent No.: US 9,966,020 B2
(45) Date of Patent: May 8, 2018

(54) GAMMA REFERENCE VOLTAGE RIPPLE FILTER CIRCUIT AND LIQUID CRYSTAL DISPLAY

(71) Applicant: Shenzhen China Star Optoelectronics Technology Co., Ltd., Shenzhen, Guangdong (CN)

(72) Inventors: Li Zhou, Guangdong (CN); Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 173 days.

(21) Appl. No.: 14/905,786

(22) PCT Filed: Dec. 24, 2015

(86) PCT No.: PCT/CN2015/098638
§ 371 (c)(1),
(2) Date: Jan. 16, 2016

(87) PCT Pub. No.: WO2017/092095
PCT Pub. Date: Jun. 8, 2017

(65) Prior Publication Data
US 2017/0229076 A1    Aug. 10, 2017

(30) Foreign Application Priority Data
Dec. 1, 2015 (CN) .......................... 2015 1 0863666

(51) Int. Cl.
*G09G 3/36* (2006.01)
*G09G 3/00* (2006.01)
(Continued)

(52) U.S. Cl.
CPC ......... *G09G 3/3607* (2013.01); *G02F 1/1345* (2013.01); *G02F 1/1368* (2013.01);
(Continued)

(58) Field of Classification Search
CPC ................. G09G 3/3607; G09G 3/006; G09G 2310/027; G09G 2320/247; G02F 1/1368; G02F 1/1345
See application file for complete search history.

(56) References Cited

U.S. PATENT DOCUMENTS 6,806,861 B1 * 10/2004 Sakaguchi ........... G09G 3/3696
345/100
2006/0119739 A1 * 6/2006 Chang .................. G09G 3/2011
348/650
(Continued)

FOREIGN PATENT DOCUMENTS

CN        1432987 A    7/2003
CN      102682723 A    9/2012
(Continued)

*Primary Examiner* — Ryan A Lubit
(74) *Attorney, Agent, or Firm* — Andrew C. Cheng (57) ABSTRACT

The present invention discloses a gamma reference voltage ripple filter circuit and a liquid crystal display, including: a filter module to receive the gamma reference voltage from the gamma reference voltage circuit, filter the gamma reference voltage, and output the filtered gamma reference voltage to a thin film transistor liquid crystal display; a detection module to detect the filtered gamma reference voltage and obtain a detection voltage; a comparison module to compare the detection voltage and obtain a comparison result; and a regulator module to regulate the filter module according to the comparison result, and make the ripple of the filtered gamma reference voltage in a in a default range. The disclosure can stable the voltage difference in the two terminals of the liquid crystal, avoiding the instability of the reversing angle of the liquid crystal to produce flicker phenomenon, affecting the display quality.

8 Claims, 2 Drawing Sheets (51) Int. Cl.
*G02F 1/1345* (2006.01)
*G02F 1/1368* (2006.01)

(52) U.S. Cl.
CPC ....... *G09G 3/006* (2013.01); *G09G 2310/027* (2013.01); *G09G 2320/0247* (2013.01)

(56) References Cited

U.S. PATENT DOCUMENTS

| | | | | |
|---|---|---|---|---|
| 2013/0038516 A1* | 2/2013 | Tsai | ................ | G09G 3/3655 345/89 |
| 2013/0135362 A1* | 5/2013 | Kim | ................ | G09G 3/20 345/690 |
| 2014/0111402 A1* | 4/2014 | Kim | ................ | G09G 3/3291 345/76 |
| 2016/0209711 A1* | 7/2016 | Ge | ................ | G02F 1/1343 |

FOREIGN PATENT DOCUMENTS

| | | |
|---|---|---|
| CN | 103001474 A | 3/2013 |
| CN | 103065594 A | 4/2013 |
| CN | 104036743 A | 9/2014 |
| CN | 104376823 A | 2/2015 |
| EP | 0665684 A3 | 8/1995 |

\* cited by examiner

GAMMA REFERENCE VOLTAGE RIPPLE FILTER CIRCUIT AND LIQUID CRYSTAL DISPLAY

CROSS REFERENCE

This application claims the priority of Chinese Patent Application No. 201510863666.4, entitled "GAMMA REFERENCE VOLTAGE RIPPLE FILTER CIRCUIT AND LIQUID CRYSTAL DISPLAY", filed on Dec. 1, 2015, the disclosure of which is incorporated herein by reference in its entirety.

FIELD OF THE INVENTION

The present invention relates to a liquid crystal display technology field, and more particularly to a gamma reference voltage ripple filter circuit and liquid crystal display.

BACKGROUND OF THE INVENTION

A plurality pixel unit is formed in the panel of the thin film transistor liquid crystal display, and each pixel unit has a red, green and blue sub-pixel. The luminance of the sub-pixel is determined by the gamma reference voltage. The function of the generating circuit of gamma reference voltage is to determine the gamma reference voltage by the request of the gamma curve of the liquid crystal display and to be a reference voltage of the grayscale display of the thin film transistor liquid crystal display. Each of the gamma reference voltage is input to the source driving device of the thin film transistor liquid crystal display, by the calculation by the digital to analog converter in the source driving device, to generate all of the grayscale voltage.

In the process of the gamma reference voltage transmitting from the gamma reference voltage circuit to the thin film transistor liquid crystal display, the ripple will easily occur by the interference and makes the distortion of the gamma reference voltage. In order to solve the question above, a LC filter circuit is formed between the gamma reference voltage circuit and the thin film transistor liquid crystal display to filter the gamma reference voltage in the conventional technology. But since the characteristic of each of the pixel unit is different, the capacitance characteristic of each of the pixel unit is different. So the filter effect of the gamma reference voltage is influenced. If the filter effect of the gamma reference voltage is enough, the voltage difference is unstable in the two terminals of the liquid crystal, causing the instability of the reversing angle of the liquid crystal to produce flicker phenomenon, affecting the display quality.

SUMMARY OF THE INVENTION

The technical issue that the embodiment of the present invention solves is to provide a gamma reference voltage ripple filter circuit and a liquid crystal display to filter the ripple voltage and avoid the flicker phenomenon.

The present invention provides a gamma reference voltage ripple filter circuit is including: a filter module, wherein the filter module is used to receive the gamma reference voltage from the gamma reference voltage circuit, filter the gamma reference voltage, and output the filtered gamma reference voltage to a thin film transistor liquid crystal display; a detection module to detect the filtered gamma reference voltage and obtain a detection voltage; a comparison module to compare the detection voltage and obtain a comparison result; and a regulator module to regulate the filter module according to the comparison result, and make the ripple of the filtered gamma reference voltage in a in a default range.

Selectively, an adjustable resistor and a filter capacitor are included in the filter module; a first sampling resistor, a second sampling resistor and an analog-to-digital converter are included in the detection module; a controller integrates the comparison module and the regulator module, wherein one terminal of the adjustable resistor is connected to the gamma reference voltage circuit, the other terminal of the adjustable resistor is connected to the thin film transistor liquid crystal display, one terminal of the filter capacitor is connected to the other terminal of the adjustable resistor and the common terminal of the thin film transistor liquid crystal display, the other terminal of the filter capacitor is connected to ground; the one terminal of the first sampling resistor is connected to the other terminal of the adjustable resistor and the common terminal of the thin film transistor liquid crystal display; the other terminal of the first sampling resistor is connected to one terminal of the second sampling resistor, the other terminal of the second sampling resistor is connected to ground; the common terminal of the first sampling resistor and the second sampling resistor are connected to the common terminal of the analog-to-digital converter, the other terminal of the analog-to-digital converter is connected to one terminal of the controller, and the other terminal of the controller is connected to the adjustable terminal of the adjustable resistor; and the filtered gamma reference voltage is obtained by the gamma reference voltage pass through and filter by the adjustable resistor and the filter capacitor, the filtered gamma reference voltage is divided by the first sampling resistor and the second sampling resistor and obtained a divided voltage, the divided voltage is converted by the analog-to-digital converter and obtain a digital signal; the digital signal is compared with the comparing voltage saved in the controller, and adjust the resistance of the adjustable resistor to make the ripple of the filtered gamma reference voltage output by the filter module in a default range.

Selectively, the adjustable resistor and the controller are integrated in the gamma reference voltage circuit.

Selectively, a first resistor, a first sub capacitor, a second resistor and a second sub capacitor are included in the filter module; a third resistor, and a fourth resistor are included in the detection module; a first comparison unit and a second comparison unit are included in the comparison module; and an OR arithmetic unit, a first switch transistor, a second switch transistor, a fifth resistor and a third switch transistor are included in the detection module; wherein the first terminal of the first switch transistor is connected to the gamma reference voltage circuit, the second terminal of the first switch transistor is connected to one terminal of the first resistor, the other terminal of the first resistor is connected to one terminal of the first sub capacitor, the other terminal of the first sub capacitor is connected to ground, the other terminal of the first resistor and the common terminal of one terminal of the first sub capacitor are connected to the thin film transistor liquid crystal display, the other terminal of the first resistor and one terminal, the common terminal of the first sub capacitor is connected to one terminal of the third resistor, the other terminal of the third resistor and the common terminal of the fourth resistor are connected to the positive end of the first comparison unit, the negative end of the first comparison unit is used for input a first reference voltage, the output terminal of the first comparison unit is connected to the first input terminal of the OR arithmetic unit, the common terminal of the third resistor and the fourth resistor is connected to the negative end of the second comparison unit, the positive end of the second comparison unit is used for input a second reference voltage, the output terminal of the second comparison unit is connected to the second input terminal of the OR arithmetic unit, the output terminal of the OR arithmetic unit is connected to the third terminal of the first switch transistor, the output terminal of the OR arithmetic unit is connected to the first terminal of the second switch transistor, the second terminal of the second switch transistor is connected to one terminal of the fifth resistor, the other terminal of the fifth resistor is connected to the power source, the third terminal of the second switch transistor is connected to ground, the first terminal of the third switch transistor is connected to the gamma reference voltage circuit, the second terminal of the second switch transistor is connected to the fifth resistor and the common terminal of the second switch transistor, the third terminal of the third switch transistor is connected to one terminal of the second resistor, the other terminal of the second resistor is connected to one terminal of the second sub capacitor, the other terminal of the second sub capacitor is connected to ground, the common terminals of the second resistor and the second sub capacitor are connected to the thin film transistor liquid crystal display, wherein the filter capacity of the first resistor and the first sub capacitor is smaller than the filter capacity of the second resistor and the second sub capacitor.

Selectively, the resistance of the first resistor is less than the resistance of the second resistor, the capacitance of the first sub capacitor is equal to the capacitance of the second sub capacitor.

The present invention also provides a liquid crystal display, including a liquid crystal display and a substrate wherein the liquid crystal display having a gamma reference voltage ripple filter circuit, and the gamma reference voltage ripple filter circuit including a filter module, wherein the filter module is used to receive the gamma reference voltage from the gamma reference voltage circuit, filter the gamma reference voltage, and output the filtered gamma reference voltage to a thin film transistor liquid crystal display; a detection module to detect the filtered gamma reference voltage and obtain a detection voltage; a comparison module to compare the detection voltage and obtain a comparison result; and a regulator module to regulate the filter module according to the comparison result, and make the ripple of the filtered gamma reference voltage in a in a default range.

Selectively, an adjustable resistor and a filter capacitor are included in the filter module; a first sampling resistor, a second sampling resistor and an analog-to-digital converter are included in the detection module; a controller integrates the comparison module and the regulator module, wherein one terminal of the adjustable resistor is connected to the gamma reference voltage circuit, the other terminal of the adjustable resistor is connected to the thin film transistor liquid crystal display, one terminal of the filter capacitor is connected to the other terminal of the adjustable resistor and the common terminal of the thin film transistor liquid crystal display, the other terminal of the filter capacitor is connected to ground; the one terminal of the first sampling resistor is connected to the other terminal of the adjustable resistor and the common terminal of the thin film transistor liquid crystal display; the other terminal of the first sampling resistor is connected to one terminal of the second sampling resistor, the other terminal of the second sampling resistor is connected to ground; the common terminal of the first sampling resistor and the second sampling resistor are connected to the common terminal of the analog-to-digital converter, the other terminal of the analog-to-digital converter is connected to one terminal of the controller, and the other terminal of the controller is connected to the adjustable terminal of the adjustable resistor; and the filtered gamma reference voltage is obtained by the gamma reference voltage pass through and filter by the adjustable resistor and the filter capacitor, the filtered gamma reference voltage is divided by the first sampling resistor and the second sampling resistor and obtained a divided voltage, the divided voltage is converted by the analog-to-digital converter and obtain a digital signal; the digital signal is compared with the comparing voltage saved in the controller, and adjust the resistance of the adjustable resistor to make the ripple of the filtered gamma reference voltage output by the filter module in a default range.

Selectively, the adjustable resistor and the controller are integrated in the gamma reference voltage circuit.

Selectively, a first resistor, a first sub capacitor, a second resistor and a second sub capacitor are included in the filter module; a third resistor, and a fourth resistor are included in the detection module; a first comparison unit and a second comparison unit are included in the comparison module; and an OR arithmetic unit, a first switch transistor, a second switch transistor, a fifth resistor and a third switch transistor are included in the detection module; wherein the first terminal of the first switch transistor is connected to the gamma reference voltage circuit, the second terminal of the first switch transistor is connected to one terminal of the first resistor, the other terminal of the first resistor is connected to one terminal of the first sub capacitor, the other terminal of the first sub capacitor is connected to ground, the other terminal of the first resistor and the common terminal of one terminal of the first sub capacitor are connected to the thin film transistor liquid crystal display, the other terminal of the first resistor and one terminal, the common terminal of the first sub capacitor is connected to one terminal of the third resistor, the other terminal of the third resistor and the common terminal of the fourth resistor are connected to the positive end of the first comparison unit, the negative end of the first comparison unit is used for input a first reference voltage, the output terminal of the first comparison unit is connected to the first input terminal of the OR arithmetic unit, the common terminal of the third resistor and the fourth resistor is connected to the negative end of the second comparison unit, the positive end of the second comparison unit is used for input a second reference voltage, the output terminal of the second comparison unit is connected to the second input terminal of the OR arithmetic unit, the output terminal of the OR arithmetic unit is connected to the third terminal of the first switch transistor, the output terminal of the OR arithmetic unit is connected to the first terminal of the second switch transistor, the second terminal of the second switch transistor is connected to one terminal of the fifth resistor, the other terminal of the fifth resistor is connected to the power source, the third terminal of the second switch transistor is connected to ground, the first terminal of the third switch transistor is connected to the gamma reference voltage circuit, the second terminal of the second switch transistor is connected to the fifth resistor and the common terminal of the second switch transistor, the third terminal of the third switch transistor is connected to one terminal of the second resistor, the other terminal of the second resistor is connected to one terminal of the second sub capacitor, the other terminal of the second sub capacitor is connected to ground, the common terminals of the second resistor and the second sub capacitor are connected to the thin film transistor liquid crystal display, wherein the filter capacity of the first resistor and the first sub capacitor is smaller than the filter capacity of the second resistor and the second sub capacitor.

Selectively, the resistance of the first resistor is less than the resistance of the second resistor; the capacitance of the first sub capacitor is equal to the capacitance of the second sub capacitor.

Comparing to the conventional technology, the present invention can detect the voltage output from the gamma reference voltage ripple filter circuit, and obtain a comparison result from the comparing of the detection voltage, and adjust the filter module by the comparison result to make the ripple of the filtered gamma reference voltage output by the filter module in a default range and stable the voltage difference in the two terminals of the liquid crystal, avoiding the instability of the reversing angle of the liquid crystal to produce flicker phenomenon, affecting the display quality.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Specifically, the terminologies in the embodiments of the present invention are merely for describing the purpose of the certain embodiment, but not to limit the invention. Examples and the appterminaled claims be implemented in the present invention requires the use of the singular form of the book "an", "the" and "the" are intterminaled to include most forms unless the context clearly dictates otherwise. It should also be understood that the terminology used herein that "and/or" means and includes any or all possible combinations of one or more of the associated listed items.

Figure 1:
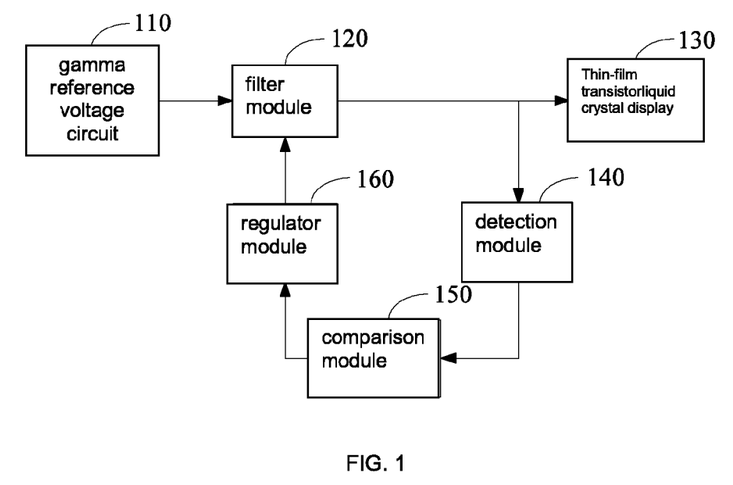
FIG. 1 illustrate a circuit block diagram of the ripple filter circuit for gamma reference voltage of the present invention.

Please refer to FIG. 1, FIG. 1 illustrate a circuit block diagram of the ripple filter circuit for gamma reference voltage of the present invention and includes a filter module 120, a detection module 140, a comparison module 150, and a regulator module 160. The circuit of the gamma reference voltage 110 is connected to the first terminal of the filter module 120, the second terminal of the filter module 120 is connected to the thin film transistor liquid crystal display 130. The filter module 120 and the common terminal of the thin film transistor liquid crystal display 130 is connected to one terminal of the detection module 140, the other terminal of the detection module 140 is connected to one terminal of the comparison module 150. The other terminal of the comparison module 150 is connected to one terminal of the regulator module 160, and the other terminal of the regulator terminal 160 is connected to the third terminal of the filter module 120.

The circuit of the gamma reference voltage 110 outputs the gamma reference voltage to the filter module 120. The gamma reference voltage received by the filter module 120, the gamma reference voltage is filtered and transmitted to the thin film transistor liquid crystal display 130. The filtered gamma reference voltage is output by the filter module 120 and received by the detection module 140, a test voltage is generated by the testing of the filtered gamma reference voltage and the test voltage is transmitted to the comparison module 150. The test voltage is output by the detection module 140 and received by the comparison module 150, and a comparison result is generated by the comparison module 150 and transmitted to the regulator module 160. The comparison result is received by the regulator module 160 and the regulator module 160 regulate the filter module 120 according to the comparison result and make the ripple of the filtered gamma reference voltage output from the filter module 120 in a default range.

Comparing to the conventional technology, the output voltage by the ripple filter circuit for the gamma reference voltage can be tested, a comparison result can be compared and obtained by the test voltage, and finally regulate the filter module according to the comparison result and make the ripple of the filtered gamma reference voltage output from the filter module 120 in a default range and stable the voltage difference in the two terminals of the liquid crystal, avoiding the instability of the reversing angle of the liquid crystal to produce flicker phenomenon, affecting the display quality.

Figure 2:
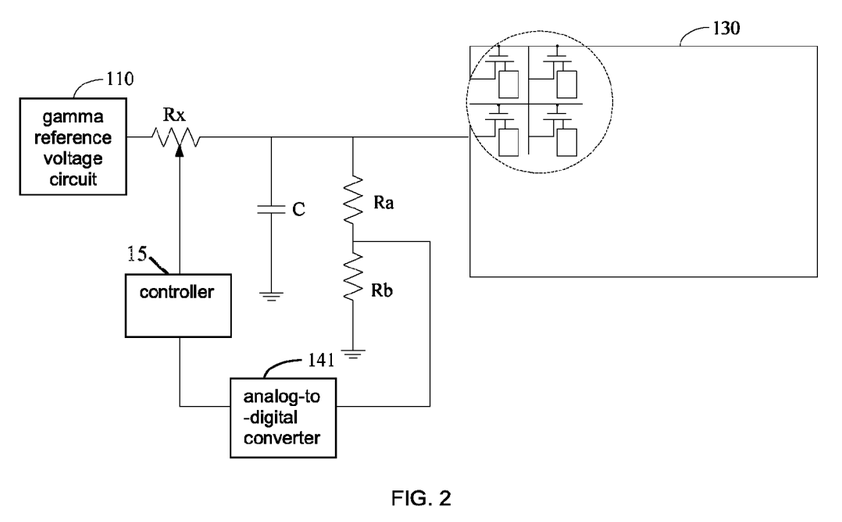
FIG. 2 illustrate a circuit of the ripple filter circuit for gamma reference voltage of the present invention.

Referring to FIG. 2, FIG. 2 illustrate a circuit of the ripple filter circuit for gamma reference voltage of the present invention. Please combined with FIG. 1, the circuit of the ripple filter circuit for gamma reference voltage in this embodiment includes a filter module 120, a detection module 140, a comparison module 150, and a regulator module 160. The filter module includes an adjustable resistor Rx and a filter capacitor C, the detection module 140 includes a first sampling resistor Ra, a second sampling resistor Rb and an analog-to-digital converter 141. The comparison module 150 and the regulator module 160 integrated in the controller 15. One terminal of the adjustable resistor Rx is connected to the gamma reference voltage circuit 110, the other terminal of the adjustable resistor Rx is connected to the thin film transistor liquid crystal display 130, one terminal of the filter capacitor C is connected to the other terminal of the adjustable resistor Rx and the common terminal of the thin film transistor liquid crystal display 130, the other terminal of the filter capacitor C is connected to ground. The one terminal of the first sampling resistor Ra is connected to the other terminal of the adjustable resistor Rx and the common terminal of the thin film transistor liquid crystal display 130. The other terminal of the first sampling resistor Ra is connected to one terminal of the second sampling resistor Rb, the other terminal of the second sampling resistor Rb is ground. The common terminal of the first sampling resistor Ra and the second sampling resistor Rb are connected to the common terminal of the analog-to-digital converter 141, the other terminal of the analog-to-digital converter 141 is connected to one terminal of the controller 15, and the other terminal of the controller 15 is connected to the adjustable terminal of the adjustable resistor Rx.

The gamma reference voltage circuit 110 outputs a gamma reference voltage, the gamma reference voltage is filtered by the adjustable resistor Rx and the filter capacitor C and the filtered gamma reference voltage is output to the thin film transistor liquid crystal display 130. The filtered gamma reference voltage is divided by the first sampling resistor Ra and the second sampling resistor Rb to obtain a divide voltage. Because the divide voltage is part of the filtered gamma reference voltage, the divide voltage can realize the ripper of the filtered gamma reference voltage. Input the simulated divide voltage into the analog-to-digital converter 141 can convert the simulated divide voltage into a digital signal. The controller 15 can compare the input digital signal and the comparing voltage saved in the storage in advance. If the ripper of the filtered gamma reference voltage is larger, the digital signal is larger than the maximum of the comparing voltage or the digital signal is smaller than the minimum of the comparing voltage. Therefore, the controller 15 can adjust the resistance of the adjustable resistor Rx until the value of the digital signal input into the controller 15 is larger than minimum of the comparing voltage and smaller than the maximum of the comparing voltage.

It can be understood, the adjustable resistor Rx and the controller 15 can integrated in the gamma reference voltage circuit 110.

Figure 3:
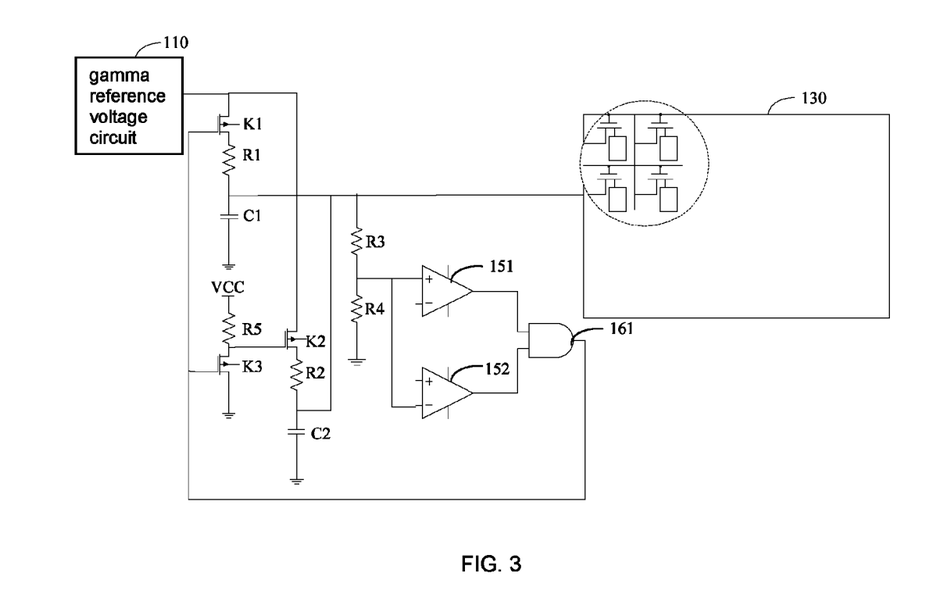
FIG. 3 illustrate another circuit of the ripple filter circuit for gamma reference voltage of the present invention.

Referring to FIG. 3, FIG. 3 illustrate another circuit of the ripple filter circuit for gamma reference voltage of the present invention. Please combined with FIG. 1, the circuit of the ripple filter circuit for gamma reference voltage in this embodiment includes a filter module 120, a detection module 140, a comparison module 150, and a regulator module 160. The filter module includes a first resistor R1, a first sub capacitor C1, a second resistor R2 and a second sub capacitor C2. The detection module 140 includes a third resistor R3, and a fourth resistor R4. The comparison module 150 includes a first comparison unit 151 and a second comparison unit 152. The regulator module 160 includes and OR arithmetic unit 161, a first switch transistor K1, a second switch transistor K2, a fifth resistor R5 and a third switch transistor K3.

The first terminal of the first switch transistor K1 is connected to the gamma reference voltage circuit 110, the second terminal of the first switch transistor K1 is connected to one terminal of the first resistor R1, the other terminal of the first resistor R1 is connected to one terminal of the first sub capacitor C1, the other terminal of the first sub capacitor C1 is connected to ground. The other terminal of the first resistor T1 and the common terminal of one terminal of the first sub capacitor C1 are connected to the thin film transistor liquid crystal display 130. The other terminal of the first resistor R1 and one terminal, the common terminal of the first sub capacitor C1 is connected to one terminal of the third resistor R3. The other terminal of the third resistor R3 and the common terminal of the fourth resistor R4 are connected to the positive end of the first comparison unit 151. The negative end of the first comparison unit 151 is used for input a first reference voltage. The output terminal of the first comparison unit 151 is connected to the first input terminal of the OR arithmetic unit 161. The common terminal of the third resistor R3 and the fourth resistor R4 is connected to the negative end of the second comparison unit 152. The positive end of the second comparison unit 152 is used for input a second reference voltage. The output terminal of the second comparison unit 152 is connected to the second input terminal of the OR arithmetic unit 161. The output terminal of the OR arithmetic unit 161 is connected to the third terminal of the first switch transistor K1. The output terminal of the OR arithmetic unit 161 is connected to the first terminal of the second switch transistor K2. The second terminal of the second switch transistor K2 is connected to one terminal of the fifth resistor R5. The other terminal of the fifth resistor R5 is connected to the power source VCC. The third terminal of the second switch transistor K2 is connected to ground. The first terminal of the third switch transistor K3 is connected to the gamma reference voltage circuit 110. The second terminal of the second switch transistor K2 is connected to the fifth resistor R5 and the common terminal of the second switch transistor K2. The third terminal of the third switch transistor K3 is connected to one terminal of the second resistor R2. The other terminal of the second resistor R2 is connected to one terminal of the second sub capacitor C2, and the other terminal of the second sub capacitor C2 is connected to ground. The common terminal of the second resistor R2 and the second sub capacitor C2 is connected to the thin film transistor liquid crystal display 130.

In the initial operation state, the first switch transistor K1 is turned on, the second switch transistor K2 is turned off, and the third switch transistor is turned on. Therefore, the first resistor R1 and the first sub capacitor C1 is connected into the circuit, the second resistor R2 and the second sub capacitor C2 is disconnected from the circuit. So, after the gamma reference voltage output from the gamma reference voltage circuit 110, the gamma reference voltage is via the first switch transistor K1, the first resistor R1 and the first sub capacitor C1 to filter the gamma reference voltage and output the gamma reference voltage to the thin film transistor liquid crystal display 130. The filtered gamma reference voltage also gets a divided voltage by the divide of the third resistor R3 and the fourth resistor R4. Since the divided voltage is part of the filtered gamma reference voltage, so the divided voltage also can realize the ripple of the filtered gamma reference voltage. The divided voltage is transmitted to the positive end of the first comparison unit 151 and the negative end of the second comparison unit 152. If the divided voltage input to the positive end of the first comparison unit 151 is larger than the first reference voltage input to the negative end of the first comparison unit 151, a high electrical level is output from the first comparison unit 151 to the OR arithmetic unit 161. If the divided voltage input to the positive end of the first comparison unit 151 is smaller than the first reference voltage input to the negative end of the first comparison unit 151, a low electrical level is output from the first comparison unit 151 to the OR arithmetic unit 161. If the divided voltage input to the negative end of the second comparison unit 152 is larger than the second reference voltage input to the positive end of the second comparison unit 152, a low electrical level is output from the second comparison unit 152 to the OR arithmetic unit 161. If the divided voltage input to the negative end of the second comparison unit 152 is smaller than the second reference voltage input to the positive end of the second comparison unit 152, a high electrical level is output from the second comparison unit 152 to the OR arithmetic unit 161. If the ripple of the filtered gamma reference voltage is larger, a high electrical level is output from the first comparison unit 151 and/or the second comparison unit 152 to the OR arithmetic unit 161, and the OR arithmetic unit 161 is output a high electrical level to the first switch transistor K1 and the third switch transistor K3. The first switch transistor K1 is stop by the function of the high electrical level output from the OR arithmetic unit 161, the second switch transistor K2 is open by the current from the power source VCC through the fifth resistor R5, so the first resistor R1 and the first sub capacitor C1 is disconnected the connection of the circuit, and the second resistor R2 and the second sub capacitor C2 is connected to the circuit. The gamma reference voltage is output from the gamma reference voltage circuit 110 and through the second switch transistor K2, the second resistor R2 and the second sub capacitor C2 to be filtered and the filtered gamma reference voltage is transmitted to the thin film transistor liquid crystal display 130. Since the filter capacity of the RC filter formed by the first resistor R1 and the first sub capacitor C1 is smaller than the filter capacity of the RC filter formed by the second resistor R2 and the second sub capacitor C2. So, when the ripple of the filtered gamma reference voltage is larger, it can be switched to the RC filter formed by the second resistor R2 and the second sub capacitor C2 with higher filter capacity and to inhibit the ripple of the filtered gamma reference voltage.

It can be understood that to make filter capacity of the RC filter formed by the first resistor R1 and the first sub capacitor C1 is smaller than the filter capacity of the RC filter formed by the second resistor R2 and the second sub capacitor C2, it can make the product of the resistance of the first resistor R1 times to the capacitance of the first sub capacitor C1 is smaller than the product of the resistance of the second resistor R2 times to the capacitance of the second sub capacitor C2, for example, the resistance of the first resistor R1 is less than the resistance of the second resistor R2, capacitance of the first sub capacitor C1 is equal to the capacitance of the second sub capacitor C2.

Those who ordinary skill in the art will be appreciated that the above-described embodiments of the method implemented in all or part of the process, can be achieved through a computer program instructing relevant hardware, the program may be stored in a computer readable storage medium, the program when executed, it may include processes such as the above-described method embodiments. Wherein the storage medium may be a magnetic disk, an optical disk, a read-only storage memory (Read-Only Memory, ROM), or random access memory (Random Access Memory, RAM) and the like.

Above are embodiments of the present invention, which does not limit the scope of the present invention. Any modifications, equivalent replacements or improvements within the spirit and principles of the embodiment described above should be covered by the protected scope of the invention.

What is claimed is:

1. A gamma reference voltage ripple filter circuit, comprising:
   a filter module, wherein the filter module is used to receive the gamma reference voltage from a gamma reference voltage circuit, filter the gamma reference voltage, and output the filtered gamma reference voltage to a thin film transistor liquid crystal display;
   a detection module to detect the filtered gamma reference voltage and obtain a detection voltage;
   a comparison module to compare the detection voltage with a first reference voltage and a second reference voltage and obtain a comparison result; and
   a regulator module to regulate the filter module according to the comparison result, and make the ripple of the filtered gamma reference voltage output from the filter module in a default range.

2. The gamma reference voltage ripple filter circuit according to claim 1, further comprising an adjustable resistor and a filter capacitor in the filter module; a first sampling resistor, a second sampling resistor and an analog-to-digital converter in the detection module; the comparison module and the regulator module are integrated in a controller, wherein one terminal of the adjustable resistor is connected to the gamma reference voltage circuit, the other terminal of the adjustable resistor is connected to the thin film transistor liquid crystal display, one terminal of the filter capacitor is connected to the other terminal of the adjustable resistor and the common terminal of the thin film transistor liquid crystal display, the other terminal of the filter capacitor is connected to ground; the one terminal of the first sampling resistor is connected to the other terminal of the adjustable resistor and the common terminal of the thin film transistor liquid crystal display; the other terminal of the first sampling resistor is connected to one terminal of the second sampling resistor, the other terminal of the second sampling resistor is connected to ground; the common terminal of the first sampling resistor and the second sampling resistor are connected to one terminal of the analog-to-digital converter, the other terminal of the analog-to-digital converter is connected to one terminal of the controller, and the other terminal of the controller is connected to the adjustable terminal of the adjustable resistor; and
   the filtered gamma reference voltage is obtained by the gamma reference voltage pass through and filter by the adjustable resistor and the filter capacitor, the filtered gamma reference voltage is divided by the first sampling resistor and the second sampling resistor and obtained a divided voltage, the divided voltage is converted by the analog-to-digital converter and obtain a digital signal; the digital signal is compared with the comparing voltage saved in the controller, and adjust the resistance of the adjustable resistor by the comparison result and to make the ripple of the filtered gamma reference voltage output by the filter module in a default range.

3. The gamma reference voltage ripple filter circuit according to claim 1, further comprising:
   a first resistor, a first sub capacitor, a second resistor and a second sub capacitor in the filter module; a third resistor, and a fourth resistor in the detection module; a first comparator and a second comparator in the comparison module; and an OR gate, a first switch transistor, a second switch transistor, a fifth resistor and a third switch transistor in the detection module;
   wherein the first terminal of the first switch transistor is connected to the gamma reference voltage circuit, the second terminal of the first switch transistor is connected to one terminal of the first resistor, the other terminal of the first resistor is connected to one terminal of the first sub capacitor, the other terminal of the first sub capacitor is connected to ground, the other terminal of the first resistor and the common terminal of one terminal of the first subcapacitor are connected to the thin film transistor liquid crystal display, the other terminal of the first resistor and one terminal, the common terminal of the first subcapacitor is connected to one terminal of the third resistor, the other terminal of the third resistor is connected to one terminal of the fourth resistor, the other terminal of the fourth resistor is connected to ground, the other terminal of the third resistor and the common terminal of the fourth resistor are connected to the positive end of the first comparator, the negative end of the first comparator is used for inputting the first reference voltage, the output terminal of the first comparator is connected to the first input terminal of the OR gate, the common terminal of the third resistor and the fourth resistor is connected to the negative end of the second comparator, the positive end of the second comparator is used for inputting the second reference voltage, the output terminal of the second comparator is connected to the second input terminal of the OR gate, the output terminal of the OR gate is connected to the third terminal of the first switch transistor, the output terminal of the OR gate is connected to the first terminal of the second switch transistor, the second terminal of the second switch transistor is connected to one terminal of the fifth resistor, the other terminal of the fifth resistor is connected to the power source, the third terminal of the second switch transistor is connected to ground, the first terminal of the third switch transistor is connected to the gamma reference voltage circuit, the second terminal of the second switch transistor is connected to the fifth resistor and the common terminal of the second switch transistor, the third terminal of the third switch transistor is connected to one terminal of the second resistor, the other terminal of the second resistor is connected to one terminal of the second sub capacitor, the other terminal of the second sub capacitor is connected to ground, the common terminals of the second resistor and the second sub capacitor are connected to the thin film transistor liquid crystal display, wherein the filter capacity of the first resistor and the first sub capacitor is smaller than the filter capacity of the second resistor and the second sub capacitor.

4. The gamma reference voltage ripple filter circuit according to claim 3, wherein the resistance of the first resistor is less than the resistance of the second resistor, the capacitance of the first sub capacitor is equal to the capacitance of the second sub capacitor.

5. A liquid crystal display, comprising:
a liquid crystal display and a substrate wherein the liquid crystal display having a gamma reference voltage ripple filter circuit, and the gamma reference voltage ripple filter circuit comprising:
a filter module, wherein the filter module is used to receive the gamma reference voltage from a gamma reference voltage circuit, filter the gamma reference voltage, and output the filtered gamma reference voltage to a thin film transistor liquid crystal display;
a detection module to detect the filtered gamma reference voltage and obtain a detection voltage;
a comparison module to compare the detection voltage with a first reference voltage and a second reference voltage and obtain a comparison result; and
a regulator module to regulate the filter module according to the comparison result, and make the ripple of the filtered gamma reference voltage output from the filter module in a default range.

6. The liquid crystal display according to claim 5, further comprising an adjustable resistor and a filter capacitor in the filter module; a first sampling resistor, a second sampling resistor and an analog-to-digital converter in the detection module; the comparison module and the regulator module are integrated in a controller, wherein one terminal of the adjustable resistor is connected to the gamma reference voltage circuit, the other terminal of the adjustable resistor is connected to the thin film transistor liquid crystal display, one terminal of the filter capacitor is connected to the other terminal of the adjustable resistor and the common terminal of the thin film transistor liquid crystal display, the other terminal of the filter capacitor is connected to ground; the one terminal of the first sampling resistor is connected to the other terminal of the adjustable resistor and the common terminal of the thin film transistor liquid crystal display; the other terminal of the first sampling resistor is connected to one terminal of the second sampling resistor, the other terminal of the second sampling resistor is connected to ground; the common terminal of the first sampling resistor and the second sampling resistor are connected to one terminal of the analog-to-digital converter, the other terminal of the analog-to-digital converter is connected to one terminal of the controller, and the other terminal of the controller is connected to the adjustable terminal of the adjustable resistor; and
the filtered gamma reference voltage is obtained by the gamma reference voltage pass through and filter by the adjustable resistor and the filter capacitor, the filtered gamma reference voltage is divided by the first sampling resistor and the second sampling resistor and obtained a divided voltage, the divided voltage is converted by the analog-to-digital converter and obtain a digital signal; the digital signal is compared with the comparing voltage saved in the controller, and adjust the resistance of the adjustable resistor by the comparison result and to make the ripple of the filtered gamma reference voltage output by the filter module in a default range.

7. The liquid crystal display according to claim 5, further comprising:
a first resistor, a first sub capacitor, a second resistor and a second sub capacitor in the filter module; a third resistor, and a fourth resistor in the detection module; a first comparator and a second comparator in the comparison module; and an OR gate, a first switch transistor, a second switch transistor, a fifth resistor and a third switch transistor in the detection module;
wherein the first terminal of the first switch transistor is connected to the gamma reference voltage circuit, the second terminal of the first switch transistor is connected to one terminal of the first resistor, the other terminal of the first resistor is connected to one terminal of the first sub capacitor, the other terminal of the first sub capacitor is connected to ground, the other terminal of the first resistor and the common terminal of one terminal of the first sub capacitor are connected to the thin film transistor liquid crystal display, the other terminal of the first resistor and one terminal, the common terminal of the first sub capacitor is connected to one terminal of the third resistor, the other terminal of the third resistor is connected to one terminal of the fourth resistor, the other terminal of the fourth resistor is connected to ground, the other terminal of the third resistor and the common terminal of the fourth resistor are connected to the positive end of the first comparator, the negative end of the first comparator is used for inputting the first reference voltage, the output terminal of the first comparator is connected to the first input terminal of the OR gate, the common terminal of the third resistor and the fourth resistor is connected to the negative end of the second comparator, the positive end of the second comparator is used for inputting the second reference voltage, the output terminal of the second comparator is connected to the second input terminal of the OR gate, the output terminal of the OR gate is connected to the third terminal of the first switch transistor, the output terminal of the OR gate is connected to the first terminal of the second switch transistor, the second terminal of the second switch transistor is connected to one terminal of the fifth resistor, the other terminal of the fifth resistor is connected to the power source, the third terminal of the second switch transistor is connected to ground, the first terminal of the third switch transistor is connected to the gamma reference voltage circuit, the second terminal of the second switch transistor is connected to the fifth resistor and the common terminal of the second switch transistor, the third terminal of the third switch transistor is connected to one terminal of the second resistor, the other terminal of the second resistor is connected to one terminal of the second sub capacitor, the other terminal of the second sub capacitor is connected to ground, the common terminals of the second resistor and the second sub capacitor are connected to the thin film transistor liquid crystal display, wherein the filter capacity of the first resistor and the first sub capacitor is smaller than the filter capacity of the second resistor and the second sub capacitor.

8. The liquid crystal display according to claim 7, wherein the resistance of the first resistor is less than the resistance of the second resistor, the capacitance of the first sub capacitor is equal to the capacitance of the second sub capacitor.

\* \* \* \* \*